(12) United States Patent
Makino et al.

(10) Patent No.: US 8,936,422 B2
(45) Date of Patent: Jan. 20, 2015

(54) BLIND NUT

(71) Applicant: Newfrey LLC, Newark, DE (US)

(72) Inventors: Takanori Makino, Toyohashi (JP);
Kanji Sakoda, Toyohashi (JP)

(73) Assignee: Newfrey LLC, Newark, DE (US)

(*) Notice: Subject to any disclaimer, the term of this patent is extended or adjusted under 35 U.S.C. 154(b) by 40 days.

(21) Appl. No.: 13/783,574

(22) Filed: Mar. 4, 2013

(65) Prior Publication Data

US 2014/0169907 A1    Jun. 19, 2014

(30) Foreign Application Priority Data

May 8, 2012    (JP) ................. 2012-106478

(51) Int. Cl.
*F16B 37/04* (2006.01)
*F16B 37/06* (2006.01)
*F16B 5/06* (2006.01)

(52) U.S. Cl.
CPC ............... *F16B 37/067* (2013.01); *F16B 5/065* (2013.01)
USPC ........................................... 411/183; 411/34

(58) Field of Classification Search
CPC .. F16B 13/061; F16B 19/1072; F16B 33/002; F16B 37/048; F16B 37/062; F16B 37/064; F16B 37/065; F16B 37/067
USPC ........... 411/34, 182, 183, 427, 436, 501, 508, 411/186
See application file for complete search history.

(56) References Cited

U.S. PATENT DOCUMENTS

| | | | | |
|---|---|---|---|---|
| 2,392,133 A | * | 1/1946 | Eklund | 411/34 |
| 2,670,021 A | * | 2/1954 | Torresen et al. | 411/34 |
| 3,030,705 A | * | 4/1962 | Gill | 29/525.11 |
| 3,181,413 A | * | 5/1965 | Wing | 411/34 |
| 3,322,449 A | * | 5/1967 | Becker | 403/388 |
| 3,369,442 A | * | 2/1968 | Darby et al. | 411/34 |
| 3,948,142 A | * | 4/1976 | McKay et al. | 411/38 |
| 4,499,647 A | * | 2/1985 | Sakamura et al. | 29/509 |
| 5,051,048 A | * | 9/1991 | Maddox | 411/34 |
| 5,294,223 A | * | 3/1994 | Phillips, II | 411/34 |
| 6,761,520 B1 | * | 7/2004 | Dise | 411/38 |

* cited by examiner

*Primary Examiner* — Roberta Delisle
(74) *Attorney, Agent, or Firm* — Kofi Schulterbrandt; Michael P. Leary

(57) ABSTRACT

A blind nut mountable in mounted members such as panels of a wide range of thicknesses. The blind nut includes an internal threading portion, a hollow tube-shaped portion adjacent to the threading portion, and an open flange formed in the tube-shaped portion on the end opposite the internal threading. The internal threading portion and the tube-shaped portion are inserted into a mounting hole in a mounted member, and a section of the tube-shaped portion is plastically deformed to enlarge the diameter in order to grip the mounted member between the deformed enlarged-diameter portion and the flange, and mount the blind nut in the mounted member. The tube-shaped portion has a tapered portion adjacent to the internal threading portion, and a cylindrical straight portion adjacent to the flange. The tapered portion and the straight portion are plastically deformed to widen their diameter and mount the blind nut on the mounted member.

7 Claims, 15 Drawing Sheets

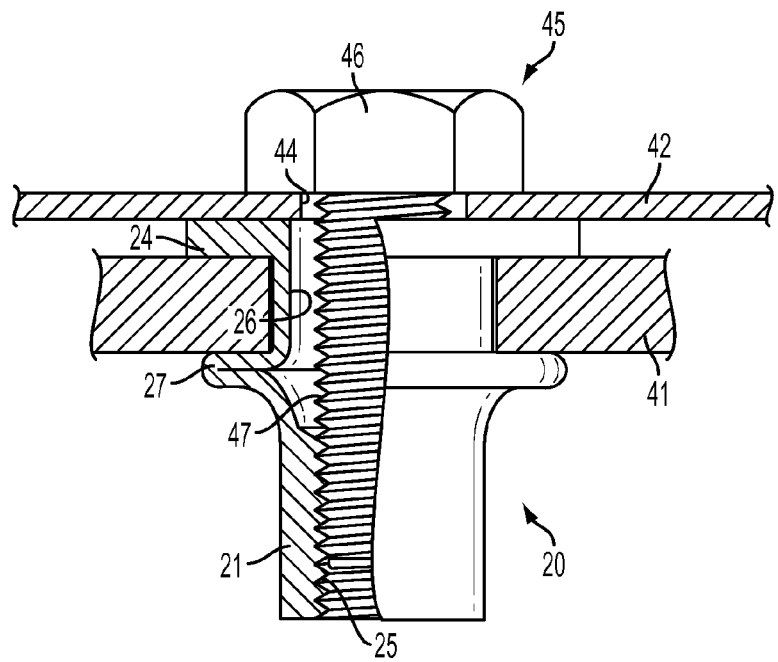
FIG. 10
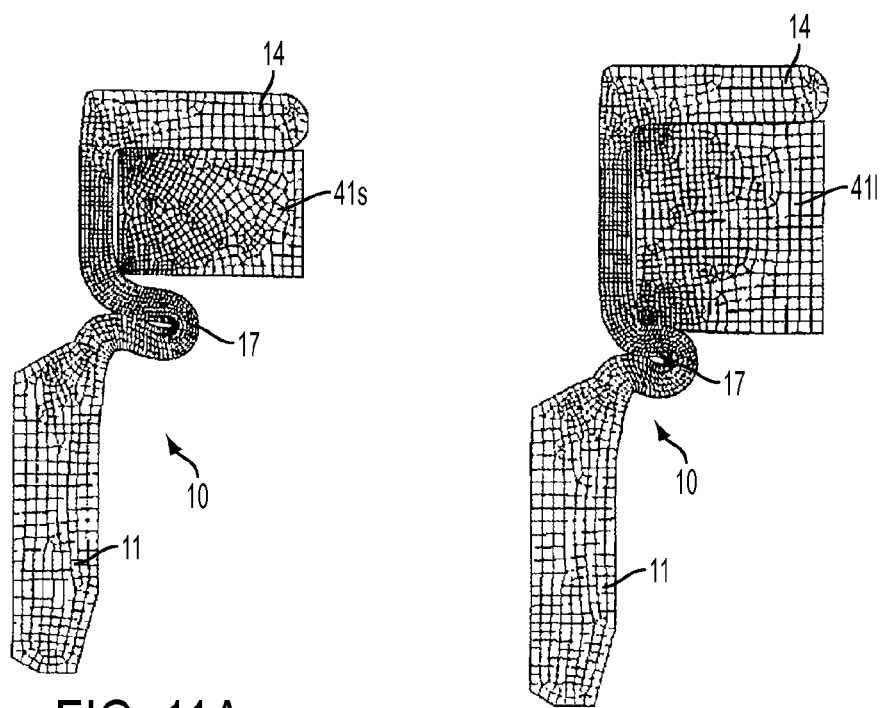
FIG. 11A
FIG. 11B

BLIND NUT

CROSS-REFERENCE TO RELATED APPLICATIONS

This application claims priority, under 35 U.S.C. §119(a)-(d), to JP Patent Application No. 2012-106478 filed May 8, 2012, the contents of which are incorporated herein by reference in its entirety.

FIELD OF THE INVENTION

The present invention relates to a blind nut. The present invention relates more specifically to a blind nut that can be mounted in mounted members such as panels having a wide range of thicknesses.

BACKGROUND OF THE INVENTION

A blind nut includes an internal threading portion, a tube-shaped portion continuing from the internal threading portion, and a flange at the end of the tube-shaped portion. A blind nut is inserted into a hole in a mounted member and a fastening tool is used to cause the tube-shaped portion to buckle, expanding the diameter of the tube-shaped portion, interposing the mounted member between the buckled tube-shaped portion and the flange, and securing the blind nut to the mounted member. The external threading of a bolt can then be screwed into the internal threading portion of the blind nut to secure another mounted member. Because a blind nut can be used from one side of a mounted member, it can be used to fasten a nut to a mounted member such as a panel whose opposite side can be difficult to reach.

FIG. 1 is a front view, including a partially cut away cross-sectional view, showing a blind nut 10 of the prior art. The blind nut 10 is cylindrical and is axially symmetrical the entire length along a central axis. An internal threading portion 11 is provided at one end. The internal threading portion 11 is cylindrical, and internal threading 15 is formed inside. The external threading of a fastening tool can be screwed into the internal threading 15. The tube-shaped portion 13 continuing from the internal threading portion 11 is cylindrical, and is thinner than the internal threading portion 11. This portion buckles when the blind nut is mounted on a mounted member 41. The blind nut 10 has a flange 14 at the end opposite the internal threading portion 11. The outer diameter of the flange 14 is greater than the inner diameter of the mounting hole 43 in the mounted member 41 so that, when the blind nut 10 is inserted into the mounting hole 43 in the mounted member 41, the bottom surface of the flange 14 comes into contact with the upper surface of the mounted member 41 and stops. A through-hole 16 is formed from the side end portion of the flange 14 to the internal threading portion 16. The inner diameter of the through-hole 16 is constant from the side end portion of the flange 14 to the tube-shaped portion 13, and the inner diameter becomes smaller in the internal threading portion 11.

FIG. 2 is a front view, including a partially cut away cross-sectional view, showing the blind nut 10 mounted in the mounting hole 43 of a mounted member 41. When the blind nut 10 is mounted using a fastening tool, the thin tube-shaped portion 13 buckles to become an enlarged-diameter portion 17, the mounted member 41 is interposed between the enlarged-diameter portion 17 and the flange 14, and the blind nut 10 is mounted in the mounted member 41.

The length of the tube-shaped portion 13 is often changed so that a single type of blind nut can be mounted in mounted members with a wide range of thicknesses. When the length of the tube-shaped portion 13 is too long relative to the thickness of the mounted member 41 and the blind nut 10 is mounted, the thin tube-shaped member 13 does not buckle uniformly to become an enlarged-diameter portion 17 with a uniform diameter around the entire circumference. A section of the enlarged-diameter portion 17 buckles inwardly, the enlarged-diameter portion 17 does not come into contact with the mounted member, and an abnormally deformed portion is likely to be formed which rises up from the surface of the mounted member.

In order to mount a blind nut in mounted members of different thicknesses without abnormally deformed portions being formed, many different types of blind nut have to be prepared with tube-shaped portions of varying lengths. Thus, a single type of blind nut that can be easily mounted in mounted members with a wide range of thicknesses, such as panels, is desired.

A blind nut is disclosed in Patent Document 1 which has an internal threading portion, a hollow tube-shaped portion, and a flange. This thick blind nut, which has a wide outer diameter, is inserted into a hole in a panel, and the tube-shaped portion is buckled to fix the blind nut in the panel using the buckled tube-shaped portion and the flange. The outer diameter of the tube-shaped portion becomes gradually smaller towards the internal threading portion. The blind nut in Patent Document 1 is problem-free because the position in the tube-shaped portion where the buckling begins is determined beforehand. The position where the blind nut begins to become deformed is the position corresponding to the surface of the mounted member or a position in the tube-shaped portion adjacent to the internal threading portion. However, the blind nut in Patent Document 1 cannot be fastened to mounted members with a wide range of thicknesses.

A blind nut is disclosed in Patent Document 2 which as an internal threading portion, a hollow tube-shaped portion, and a flange. This blind nut is inserted into a hole in a panel, and the tube-shaped portion is buckled to fix the blind nut in the panel using the buckled tube-shaped portion and the flange. In this blind nut, the tube-shaped portion has a cylindrical portion that is thinner than the internal threading portion, and a compressed-diameter portion formed between the cylindrical portion and the internal threading portion. When this blind nut is fastened, the tube-shaped portion begins to bend at the compressed-diameter portion. However, the length of the compressed-diameter portion is short, so the blind nut in Patent Document 2 cannot be fastened to mounted members with a wide range of thicknesses.

Therefore, a single type of blind nut is desired that can be easily mounted in mounted members such as panels having a wide range of thicknesses. Also desired is a blind nut having a tube-shaped portion whose diameter can be sufficiently enlarged to ensure reliable mounting in a mounted member.

PRIOR ART DOCUMENTS

Laid-Open Utility Model Publication No. 59-146607 (hereinafter "Patent Document 1")
Laid-Open Patent Publication No. 11-270535 (hereinafter "Patent Document 2")

BRIEF SUMMARY OF THE INVENTION

Therefore, an object of the present invention is to provide a single type of blind nut that can be easily mounted in mounted members such as panels having a wide range of thicknesses. Another object of the present invention is to provide a blind nut having a tube-shaped portion whose diameter can be sufficiently enlarged to ensure reliable mounting in a mounted member.

In order to achieve these objects, the present invention has a tube-shaped portion whose diameter is enlarged, and this tube-shaped portion has a cylindrical straight portion, and a tapered portion between the straight portion and the internal threading portion. Here, the diameter of the boundary portion between the straight portion and the tapered portion is enlarged. Buckling problems are less frequent when this blind nut is mounted, whether mounted in a thin-panel mounted member or in a thick-panel mounted member.

One aspect of the present invention is a blind nut including an internal threading portion having internal threading formed on the inside, a hollow tube-shaped portion adjacent to the threading portion, and an open flange formed in the tube-shaped portion on the end opposite the internal threading. The internal threading portion and the tube-shaped portion are inserted into a mounting hole in a mounted member, and a section of the tube-shaped portion is plastically deformed to enlarge the diameter. This grips the mounted member between the deformed enlarged-diameter portion and the flange, and mounts the blind nut in the mounted member. The blind nut in this aspect of the present invention is characterized by a tube-shaped portion having a cylindrical straight portion adjacent to the flange, and a tapered portion which becomes gradually narrower from the straight portion towards the internal threading portion.

Because the diameter of the boundary portion between the straight portion and the tapered portion is enlarged, the position at which the diameter begins to be enlarged is constant, and the blind nut is reliably secured to the mounted member without buckling problems occurring. Because the boundary portion is plastically deformed so that the outer diameter of the enlarged-diameter portion is sufficiently enlarged, the release strength is high, and the blind nut is reliably secured.

Preferably, the straight portion and the tapered portion have the same thickness. In this way, the diameter of the boundary portion between the straight portion and the tapered portion can be enlarged to the same extent vertically.

The angle of the tapered portion relative to the straight portion is from 1 to 20°. The angle is preferably from 2 to 15°. The angle is more preferably from 3 to 8°. A smaller tapering angle ensures a tapered portion of sufficient length.

Preferably, the blind nut is within the range of $0.09x_1 + 0.15 < y_1 < 0.35x_1 + 1.5$, when the outer diameter of the straight portion is $x_1$ (mm) and the length of the section of the straight portion protruding from the mounted member is $y_1$ (mm). When the length of the straight portion is within this range, buckling does not occur.

Preferably, the blind nut is within the range of $0.22x_2 + 0.4 < y_2 < 0.45x_2 + 1.4$, when the length of the straight portion is $x_2$ (mm) and the length of the tapered portion is $y_2$ (mm). When the length of the tapered portion is within this range, buckling does not occur.

The present invention provides a single type of blind nut that can be easily mounted in mounted members such as panels having a wide range of thicknesses. The present invention can also provide a blind nut having a tube-shaped portion whose diameter can be sufficiently enlarged to ensure reliable mounting in a mounted member.

BRIEF DESCRIPTION OF THE DRAWINGS

FIG. 10 is a front view, including a partially cut away cross-sectional view, showing another mounted member having been mounted, using a bolt, in the blind nut mounted in the mounted member.

FIG. 11A is a simulation in which a blind nut of the prior art is mounted in a thin mounted member and FIG. 11B is a simulation in which a blind nut of the prior art is mounted in a thick mounted member.

FIG. 15A illustrates a beginning stage, FIG. 15B illustrates an intermediate stage, and FIG. 15C illustrates a final stage of mounting.

FIG. 16A illustrates a beginning stage, FIG. 16B illustrates an intermediate stage, and FIG. 16C illustrates a final stage of mounting.

FIG. 17A illustrates a beginning stage, FIG. 17B illustrates an intermediate stage, and FIG. 17C illustrates a final stage of mounting.

FIG. 18A illustrates a beginning stage, FIG. 18B illustrates an intermediate stage, and FIG. 18C illustrates a final stage of mounting.

FIG. 19A illustrates a beginning stage, FIG. 19B illustrates an intermediate stage, and FIG. 19C illustrates a final stage of mounting.

FIG. 20A illustrates a beginning stage, FIG. 20B illustrates an intermediate stage, and FIG. 20C illustrates a final stage of mounting.

DETAILED DESCRIPTION OF THE INVENTION

Figure 3:
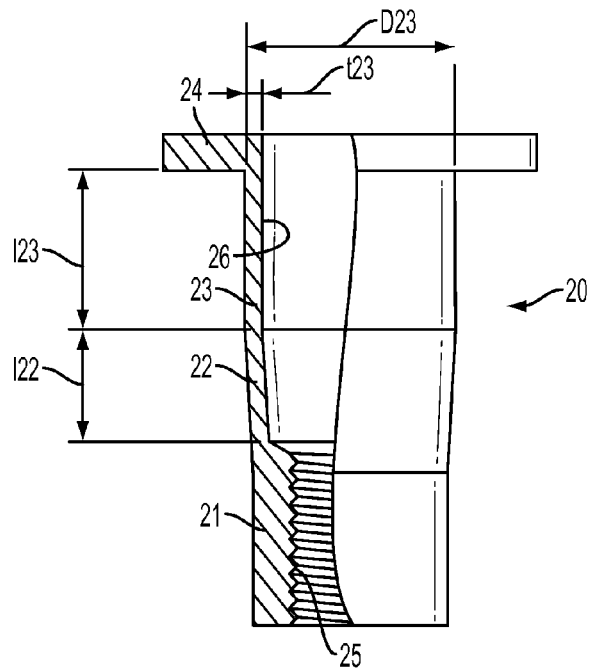
FIG. 3 is a front view, including a partially cut away cross-sectional view, showing a blind nut in an embodiment of the present invention.

The following is an explanation with reference to the figures of a blind nut 20 according to an embodiment of the present invention. FIG. 3 is a front view, including a partially cut away cross-sectional view, showing a blind nut 20 in an embodiment of the present invention. The blind nut 20 is cylindrical and axially symmetrical with respect to the center line along its entire length. It has an internal threading portion 21 on one end. The internal threading portion 21 is cylindrical and has internal threading 25 formed on the inside. The external threading of a fastening tool is screwed into the internal threading 25. After the blind nut 20 has been mounted, the external threading of a bolt can be screwed in to mount another mounted member.

The blind nut 20 has a tube-shaped portion adjacent to the internal threading portion 21. The tube-shaped portion has a tapered portion 22 adjacent to the internal threading portion 21, and a cylindrical straight portion 23 adjacent to the tapered portion 22. The tapered portion 22 has a constant thickness and is thinner than the internal threading portion 21. The outer diameter and the inner diameter become gradually larger in the upward direction (thickness t23, length l22). The straight portion 23 adjacent to the tapered portion 22 is cylindrical and has a constant thickness, which is the same as that of the tapered portion 22 (thickness t23, length l23, outer diameter D23). The section of the straight portion 23 protruding from the mounting hole 43 in the mounted member 41 and the tapered portion 22 buckle when the blind nut is mounted in the mounted member 41. The blind nut 20 has a flange 24 adjacent to the straight portion 23 on the end opposite the internal threading portion 23. The outer diameter of the flange 24 is greater than the outer diameter of the straight portion 23, and greater than the inner diameter of the mounting hole 43 in the mounted member 41.

When the blind nut 20 is inserted into the mounting hole 43 in the mounted member 41 with the internal threading portion 21 at the front, the bottom surface of the flange 24 comes into contact with the upper surface of the mounted member 41 and stops. A through-hole 26 is formed from the flange 24 end to the internal threading portion 21 end. The inner diameter of the through-hole 26 is constant from the flange 24 end to the straight portion 23, and the inner diameter becomes gradually smaller towards the internal threading portion 21 in the tapered portion 22. The inner diameter of the internal threading portion 21 is constant but even smaller, and internal threading 25 is formed on the inner surface. In FIG. 3, the outer diameter of the straight portion 23 is constant, but the outer diameter of the tapered portion 22 becomes gradually smaller towards the internal threading portion 21.

(Fastening Tool)

Figure 4:
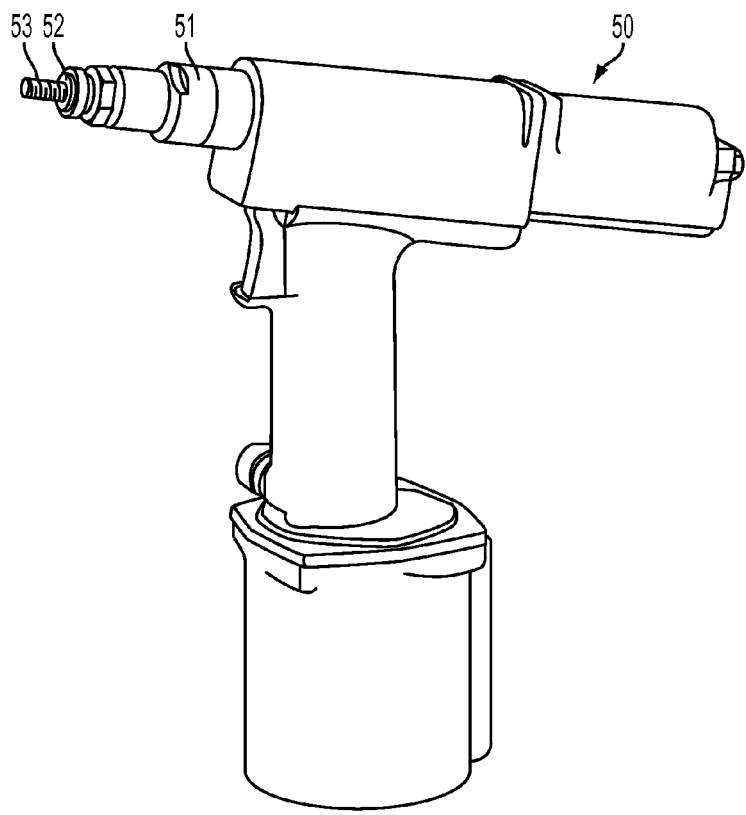
FIG. 4 is a perspective view of the fastening tool used in the present invention.
Figure 5:
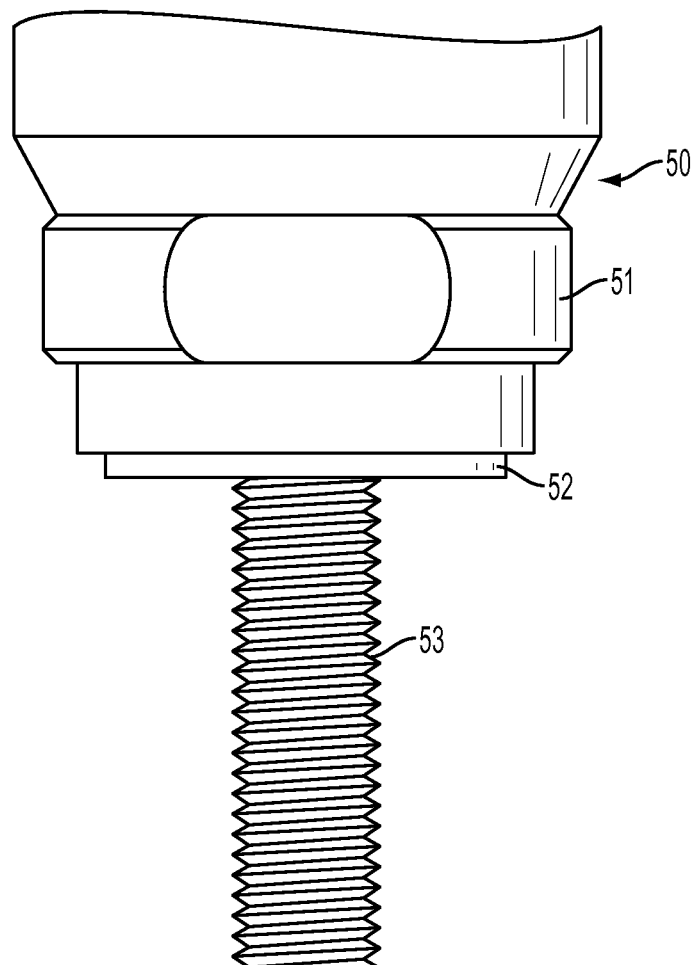
FIG. 5 is a front view of the tip of the fastening tool used in the present invention.

FIG. 4 and FIG. 5 are diagrams showing the fastening tool used in the present embodiment. FIG. 4 is a perspective view of the entire fastening tool 50 used in the present embodiment. The fastening tool 50 uses compressed air as its power source, and has a nosepiece 52 adjacent to the main body portion 51 for supporting the component to be fastened, and a screw mandrel 53 with external threading at the tip. A rotating body (not shown) is rotated, and the screw mandrel 53 at the tip is rotated in the forward or reverse direction to engage or disengage from internal threading. The component can be pushed in strongly without rotating the screw mandrel 53.

FIG. 5 is a front view of the tip of the fastening tool 50 used in the present invention. The main body portion 51 of the fastening tool 50 has a nosepiece 52 which is pressed against the mounted member. The bottom surface of the nosepiece 52 is flat. A column-shaped screw mandrel 53 having external threading formed on the outer circumference extends forward (downward in FIG. 5) at the center of the nosepiece 52.

The outer diameter of the screw mandrel 53 is smaller than the inner diameter of the through-hole 26 in the tapered portion 22 and the straight portion 23 of the blind nut 20 so that it can be inserted into the through-hole 26. The external threading of the screw mandrel 53 has an external diameter that allows it to be screwed into the internal threading 25 in the internal threading portion 21 of the blind nut 20. The fastening tool 50 rotates the screw mandrel 53 in the forward or reverse direction to engage or disengage the internal threading 25 of the internal threading portion 21. The flange 24 of the blind nut 20 can be supported by the nosepiece 52 to strongly push in the blind nut without rotating the screw mandrel.

(Mounting Operation)

Figure 6:
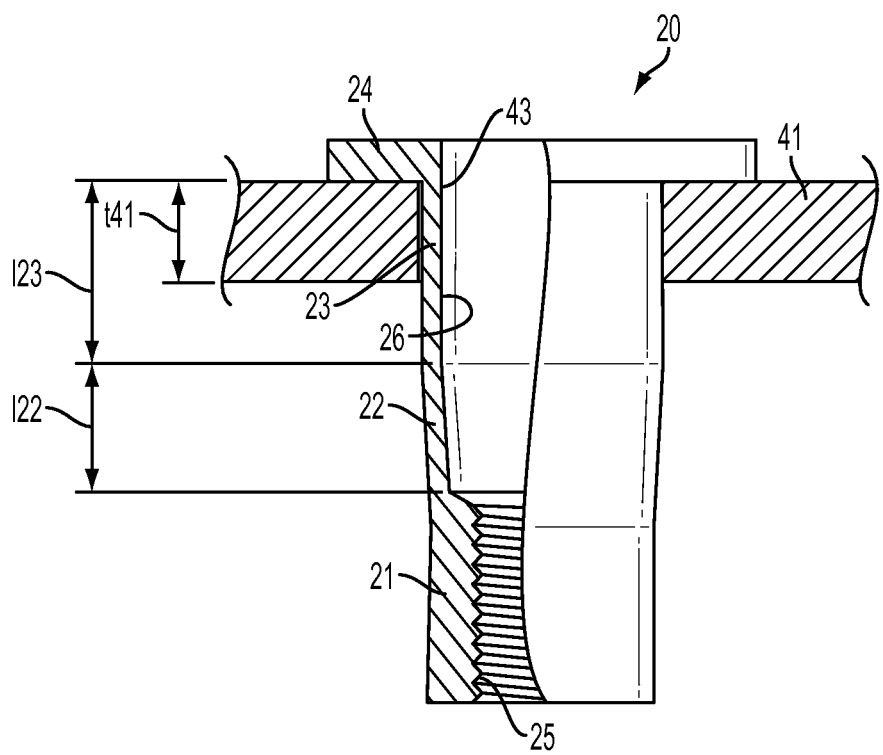
FIG. 6 is a front view, including a partially cut away cross-sectional view, showing a blind nut set in a mounted member.

The following is an explanation of the operation performed to mount the blind nut 20 in the mounted member 41 with reference to FIG. 6 through FIG. 9. FIG. 6 is a front view, including a partially cut away cross-sectional view, showing the blind nut 20 set in the mounting hole 43 of a mounted member 41 (thickness t41). The blind nut 20 is inserted into the mounting hole 43 in the mounted member 41 from the internal threading portion 21 until the bottom surface of the flange 24 comes into contact with the upper surface of the mounted member 41.

Figure 7:
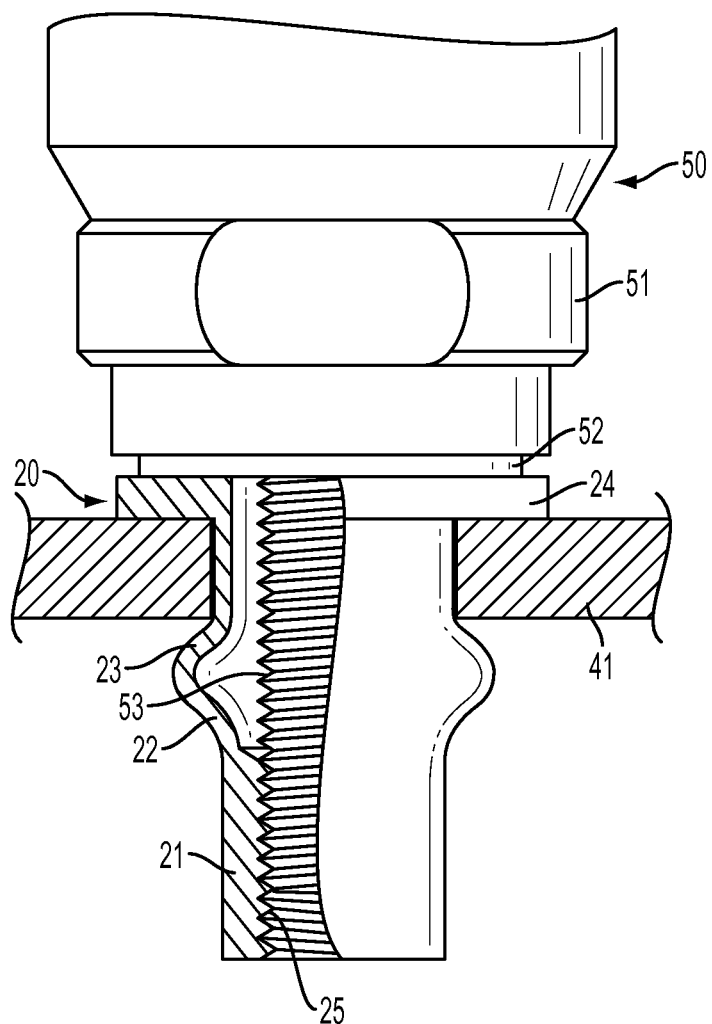
FIG. 7 is a front view, including a partially cut away cross-sectional view, showing the mounting tool set and the blind nut in the process of being mounted.

FIG. 7 is a front view, including a partially cut away cross-sectional view, showing the mounting tool 50 set and the blind nut in the process of being mounted. The screw mandrel 53 is passed through the through-hole 26 of the blind nut 20, and the screw mandrel 53 is rotated in the forward direction to screw the external threading of the screw mandrel 53 into the internal threading 25 of the internal threading portion 21. When the external threading of the screw mandrel 53 has been screwed into the internal threading 25 to a predetermined distance, the bottom surface of the nosepiece 52 of the fastening tool 50 comes into contact with the upper surface of the flange 24 of the blind nut 20, and rotation of the screw mandrel 53 stops.

With the bottom surface of the nosepiece 52 of the fastening tool 50 in contact with and supported by the flange 24 of the blind nut 20, the screw mandrel 53 is strongly pushed towards the main body portion 51 without rotating. At this time, the bottom surface of the nosepiece 52 pushes the flange 24 of the blind nut 20 downward to provide support, and the screw mandrel 53 pulls the internal threading portion 21 upwards. FIG. 7 is a front view, including a partially cut away cross-sectional view, showing the tapered portion 22 of the blind nut 20 and a section of the straight portion 23 (the section protruding downward from the mounting hole 43 in the mounted member 41) being buckled and plastically deformed so as to expand their diameters.

Because the outer diameter of the straight portion 23 inside the mounting hole 43 of the mounted member 41 is restricted by the mounting hole 43, the diameter is as large as the inner diameter of the mounting hole 43 and cannot expand any further.

Figure 8:
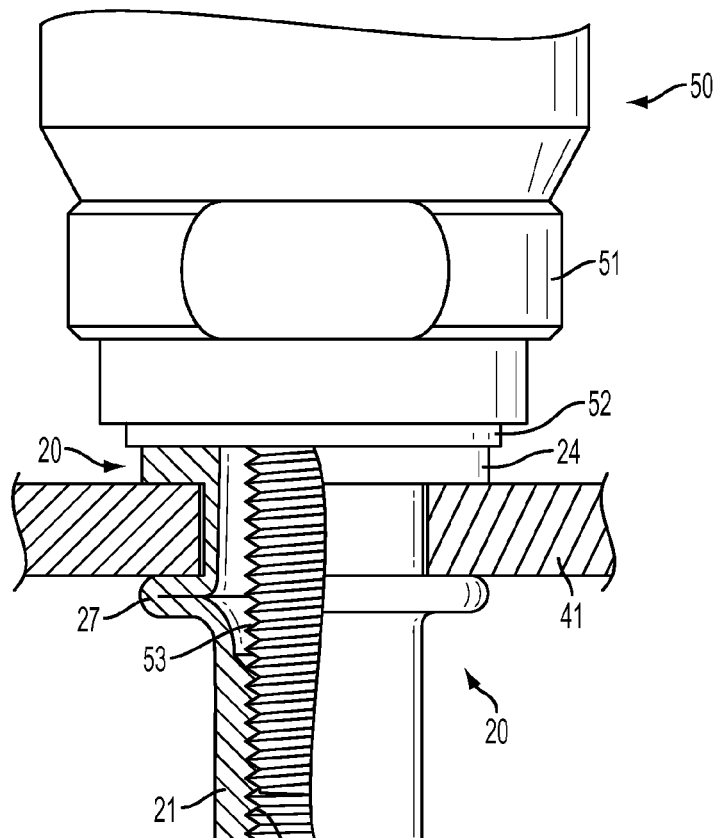
FIG. 8 is a front view, including a partially cut away cross-sectional view, showing the final wide diameter of the blind nut.

The diameter of the section of the straight portion 23 protruding downward from the bottom surface of the mounted member 41 is expanded and comes into contact with the bottom surface of the mounted member 41 surrounding the mounting hole 43. FIG. 8 is a front view, including a partially cut away cross-sectional view, showing further plastic deformation of the tapered portion 22 and the straight portion 23. This portion becomes the enlarged-diameter portion 27, and the mounted member 41 is interposed and secured by the enlarged-diameter portion 27 and the flange 24.

Figure 9:
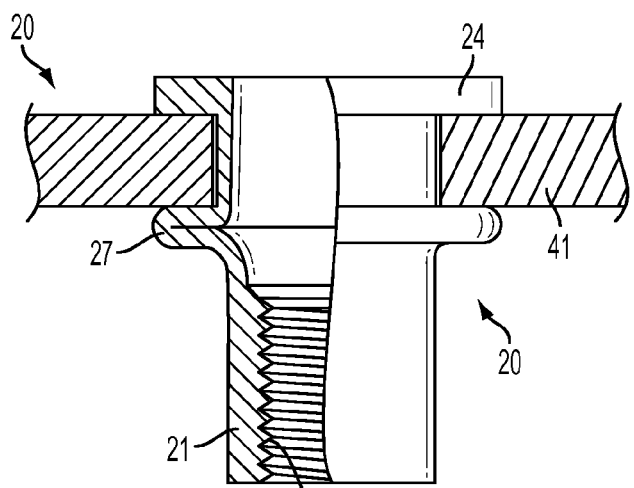
FIG. 9 is a front view, including a partially cut away cross-sectional view, showing the mounted member including the mounted blind nut removed from the fastening tool.

After the fastening tool 50 has completed the fastening process, the screw mandrel 53 is rotated in the reverse direction from FIG. 7, and the external threading of the screw mandrel 53 is unscrewed from the internal threading 25 of the internal threading portion 21. After the threading has been unscrewed, the fastening tool 50 is moved upward. FIG. 9 is a front view, including a partially cut away cross-sectional view, showing the mounted blind nut 20. Here, the fastening tool 50 has been removed from the mounted member 41 in which the blind nut 20 has been mounted.

FIG. 10 is a front view, including a partially cut away cross-sectional view, showing another mounted member 42 having been mounted, using a bolt, in the blind nut 20 mounted in the mounted member 41 shown in FIG. 9. A bolt 45 is prepared having a head portion 46 and a shaft portion 47. The external threading of the shaft portion 47 can be screwed into the internal threading 25 of the internal threading portion 21 of the blind nut 20. The through-hole 26 in the blind nut 20 is aligned with the mounting hole 44 in the other mounted member 42, and the mounted member 42 is arranged above the flange 24 of the blind nut 20. The shaft portion 47 of the bolt 45 is passed through the mounting hole 44 of the other mounted member 42, and inserted into the through-hole 26 in the blind nut 20. The external threading of the shaft portion 47 of the bolt 45 is screwed into the internal threading 25 of the internal threading portion 21 of the blind nut 20, and the other mounted member 42 is mounted in the blind nut 20. In FIG. 10, the other mounted member 42 is mounted on the flange 24 side of the blind nut 20. However, the other mounted member 42 can also be mounted on the internal threading portion 21 side of the blind nut 20 (not shown), which is on the opposite side of FIG. 10 (the bottom side in FIG. 10).

(Simulation 1)

A mounting operation simulation was performed using the finite element method. In this simulation, a blind nut 10 of the prior art in FIG. 1 with a long tube-shaped portion 13 (straight portion, outer diameter D13=10 mm, length l13=9.5 mm), and a blind nut 20 of the present embodiment in FIG. 3 with a straight portion 23 (length l23=7.1 mm, outer diameter D23=10 mm) and a tapered portion 22 (length l22=4.6 mm) were mounted in a thin mounted member 41 (panel thickness t24s=3.3 mm) and a thick mounted member 41 (panel thickness t24l=5.5 mm). FIG. 11(a) shows the blind nut 10 of the prior art mounted in the thin mounted member 41s. FIG. 11(b) shows the blind nut 10 of the prior art mounted in the thick mounted member 41l. When mounted in a thin mounted member 41s as shown in FIG. 11(a), the enlarged-diameter portion 17 rises up from the bottom surface of the mounted member 41s as it buckles. When mounted in a thick mounted member 41l as shown in FIG. 11(b), the enlarged-diameter portion 17 makes contact with the bottom surface of the mounted member 41l and is properly mounted.

Figures 12A, 12B:
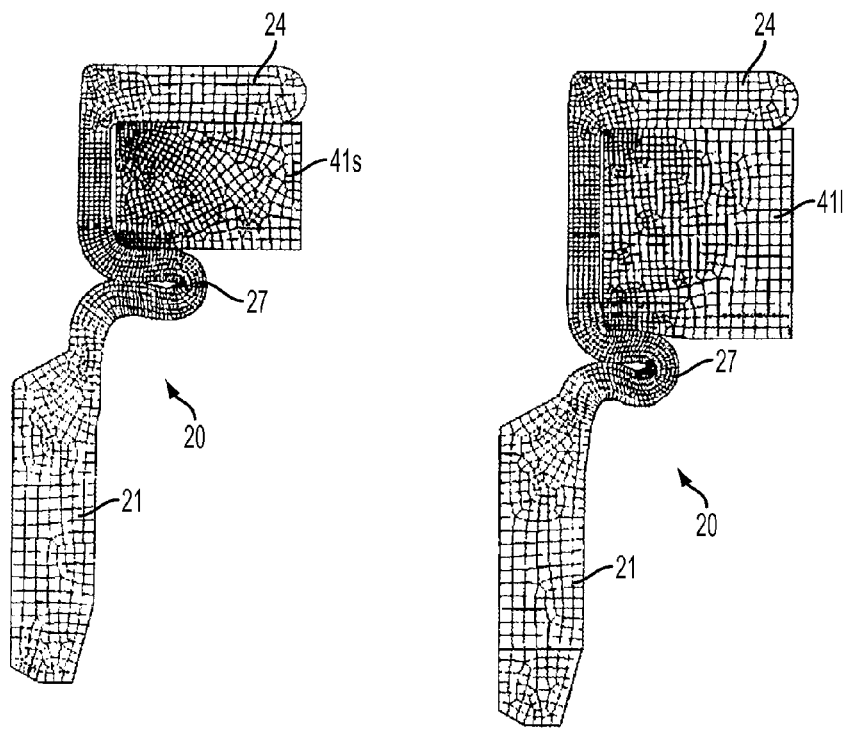
FIG. 12A is a simulation in which a blind nut in an embodiment of the present invention is mounted in a thin mounted member and FIG. 12B is a simulation in which a blind nut in an embodiment of the present invention is mounted in a thick mounted member.

FIG. 12(a) shows the blind nut 20 of the present embodiment mounted in the thin mounted member 41s. FIG. 12(b) shows the blind nut 20 of the present embodiment mounted in the thick mounted member 41l. When mounted in a thin mounted member 41s as shown in FIG. 12(a), and when mounted in a thick mounted member 41l as shown in FIG. 12(b), the enlarged-diameter portion 27 makes contact with the bottom surface of the mounted member 41 and is properly mounted. Unlike the blind nut 10 of the prior art in FIG. 11, the blind nut 20 of the present embodiment in FIG. 12 can be mounted in mounted members 41 with a wide range of thicknesses.

In the blind nut 10 of the prior art, which has a cylindrical tube-shaped portion 13, the tube-shaped portion 13 of the blind nut 10 does not begin to become enlarged at a fixed position when the tube-shaped portion 13 is too long. As a result, the enlarged-diameter portion tends to rise up off the surface of the mounted member as it buckles. There is no straight portion in the tube-shaped portion with a constant outer diameter, only a tapered portion. As a result, the blind nut begins to become enlarged in diameter on the surface of the mounted member, and the enlarged-diameter portion tends to rise off the surface of the mounted member as it continues to buckle.

When a blind nut 20 of the present embodiment is used, which has a straight portion 23 and a tapered portion 22, the boundary portion between the tapered portion 22 and the straight portion 23 becomes plastically deformed and its diameter is enlarged. Because the boundary portion is below the surface of the mounted portion, the enlarged-diameter portion 27 develops a sufficiently large outer diameter and does not rise up during buckling. The starting portion for the enlarged diameter is predetermined, and the mounted member 41 can be reliably secured. When the tapered portion 22 is sufficiently long, the outer diameter of the enlarged-diameter portion 27 is increased. As a result, the release strength is high, and the mounted member can be reliably secured.

When the outer diameter of the enlarged-diameter portion 27 is large, the release strength from the mounted member is increased, and the blind nut can be reliably mounted in the mounted member. When mounted in a mounted member made of plastic or a thin panel made out of metal, the blind nut can be mounted reliably.

The angle of the tapered portion 22 relative to the straight portion 23 has to be relatively small, that is, from 1 to 20°. The angle of the tapered portion 22 is preferably from 2 to 15°, and more preferably from 3 to 8°. The thickness of the tapered portion 22 and the straight portion 23 is preferably the same. In this way, the diameter of the boundary portion between the tapered portion 22 and the straight portion 23 is enlarged to the same extent vertically. The material of the blind nut 20 is preferably steel.

Figure 1:
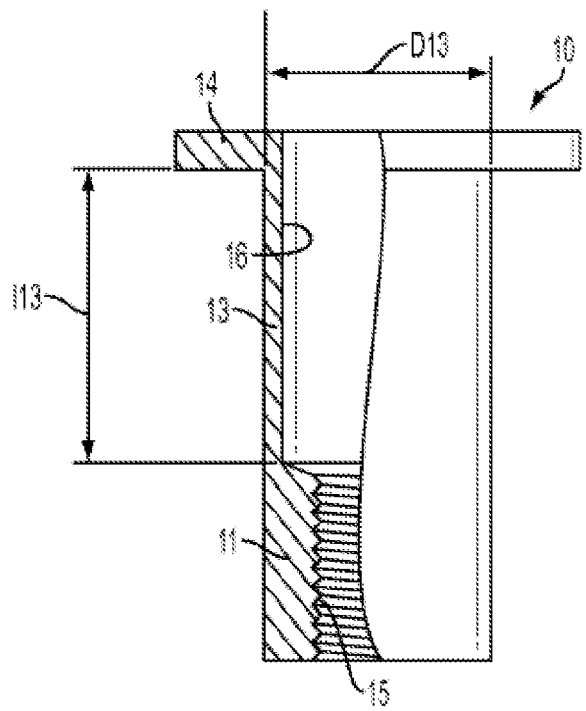
FIG. 1 is a front view, including a partially cut away cross-sectional view, showing a blind nut of the prior art.
Figure 2:
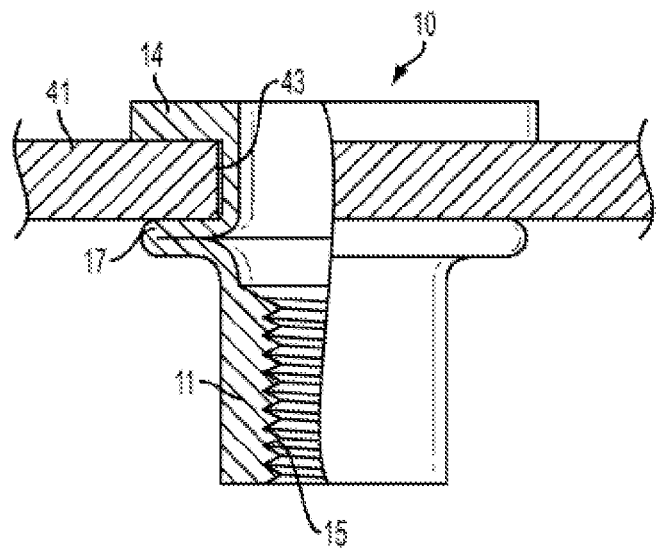
FIG. 2 is a front view, including a partially cut away cross-sectional view, showing the blind nut of FIG. 1 mounted in a mounted member.
Figure 13:
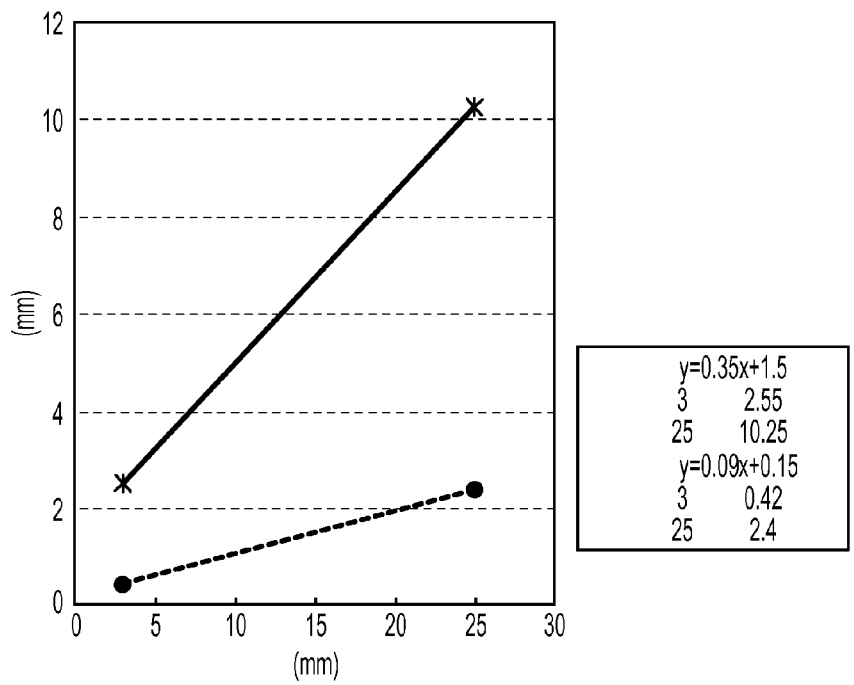
FIG. 13 is a graph showing the range of the outer diameter of the straight portion and the length of the section of the straight portion protruding from the mounted member for proper mounting of the blind nut.

(Range for the Length of the Tapered Portion 22 and the Straight Portion 23) The relationship between the outer diameter D13 and length l13 of the tube-shaped portion (straight portion) 13 the blind nut 10 of the prior art in FIG. 1 was used to determine the conditions enabling proper mounting of the blind nut. FIG. 13 is a graph showing the range of the outer diameter D13 of the straight portion 13 and the length l13 of the straight portion 13 which enables proper mounting of the blind nut 20. The length of the straight portion 13 is not the entire length l13 of the straight portion 13, but is the length of the straight portion 13 minus the panel thickness of the mounted member 41 (l13-t41). In other words, the length of the portion protruding from the mounted member 41 is related to the enlarged diameter.

The upper limit line in FIG. 13 indicates the upper limit of the length of the portion of the straight portion 13 protruding from the mounted member 41 (l13-44l) relative to the outer diameter D13 of the straight portion 13. When the length of the straight portion 13 exceeds the upper limit, buckling problems tend to occur when the blind nut 10 is mounted. The lower limit line indicates the lower limit of the length l13 of the straight portion 13 relative to the outer diameter D13 of the straight portion 13. When the length of the straight portion 13 is less than the lower limit, buckling problems tend to occur when the blind nut 10 is mounted.

When the length of the straight portion 13 is between the upper limit and the lower limit, the blind nut 10 can be mounted properly without causing buckling problems. The upper limit and the lower limit can be expressed using the following equations:

Upper Limit Equation $y_1=0.35x_1+1.5$ (Equation 1)

Lower Limit Equation $y_1=0.09x_1+0.15$ (Equation 2)

Here, the diameter of the straight portion 13 is $D13=x_1$ mm and the length of the straight portion 13 is $l13=y_1$ mm. The range of the length l13 for the straight portion 13 that enables proper mounting of the blind nut 10 is expressed by the following equation.

$0.09x_1+0.15<y_1<0.35x_1+1.5$ (Equation 3)

Figure 14:
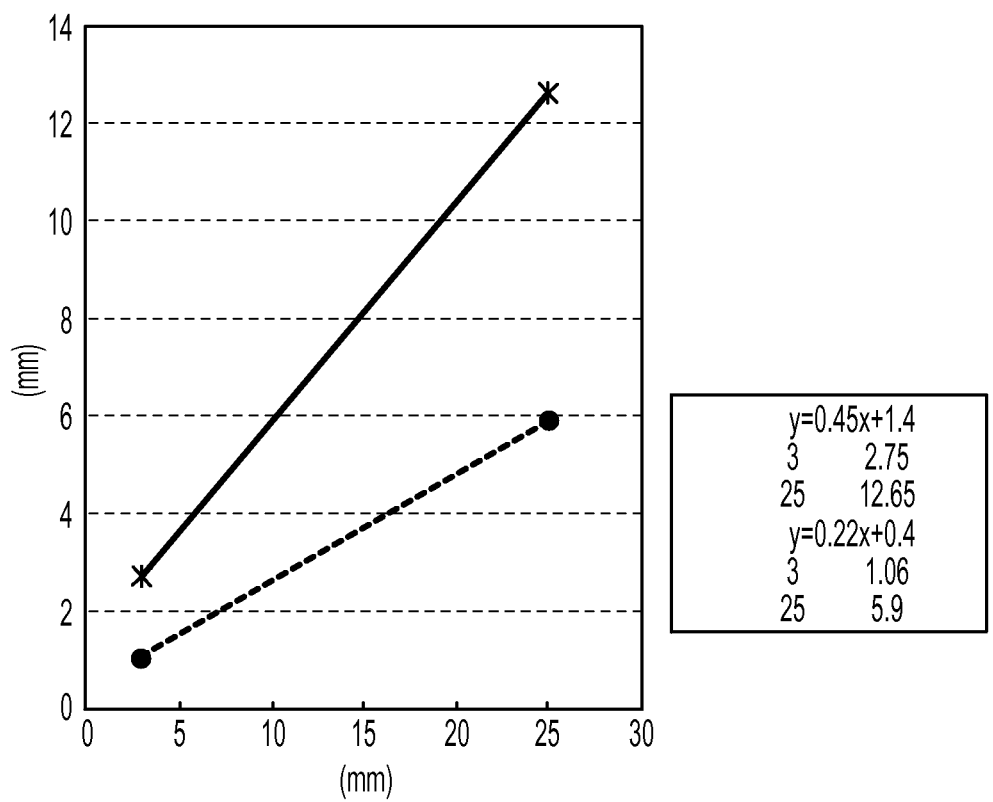
FIG. 14 is a graph showing the range of the outer diameter of the straight portion and the length of the tapered portion for proper mounting of the blind nut.

As in FIG. 13, the relationship between the outer diameter D23 of the straight portion 23 (the outer diameter at the upper end of the tapered portion 22), and the length l22 of the tapered portion 22 in the blind nut 20 of the present embodiment was used to determine the range enabling proper mounting of the blind nut 20. FIG. 14 is a graph showing the range of the outer diameter at the upper end of the tapered portion 22 (equal to the outer diameter D23 of the straight portion 23) and the length l22 of the tapered portion 22. The upper limit line in FIG. 14 indicates the upper limit of the length l22 of the tapered portion 22 relative to the outer diameter D23 of the straight portion 23. When the length of the tapered portion 22 exceeds the upper limit, buckling problems tend to occur when the blind nut 20 is mounted. The lower limit line indicates the lower limit of the length l22 of the tapered portion 22 relative to the outer diameter D23 of the straight portion 23. When the length of the tapered portion 22 is below the lower limit, buckling problems tend to occur when the blind nut 20 is mounted.

When the length l22 of the tapered portion 22 is between the upper limit and the lower limit, the blind nut 20 can be properly mounted without causing buckling problems. The upper limit and the lower limit can be expressed using the following equations:

Upper Limit Equation $y_2=0.45x_2+1.4$ (Equation 4)

Lower Limit Equation $y_2=0.22x_2+0.4$ (Equation 5)

Here, the diameter of the tapered portion 22 at the upper end is $D23=x_2$ mm, and the length l22 of the tapered portion 22 is $l22=y_2$ mm. The range of the length l22 for the tapered portion 22 that enables proper mounting of the blind nut 20 is expressed by the following equation.

$0.22x_2+0.4<y_2<0.45x_2+1.4$ (Equation 6)

In a blind nut 20 of the present embodiment having a straight portion 23 and a tapered portion 22, the length l23 of the straight portion 23 is a constant value (satisfying Equation 3), and the length l22 of the tapered portion 22 shown in FIG. 14 is increased.

(Simulation 2)

In order to determine the proper dimensional range for the length l22 of the tapered portion 22 in the blind nut 20 of the present embodiment shown in FIG. 3, a mounting operation simulation was performed using the finite element method. The length of the straight portion 23 was constant (l23=11 mm). There were three types of blind nut 20 used in the simulation: one with a short tapered portion 22 (l22s=3.3 mm), one with a medium-length tapered portion 22 (l22m=5.0 mm), and one with a long tapered portion 22 (l22l=6.7 mm). In the simulation, the blind nuts were fastened to a thin mounted member (panel thickness: t41s=3.3 mm) and to a thick mounted member (panel thickness: t41l=5.5 mm).

Figure 15C:
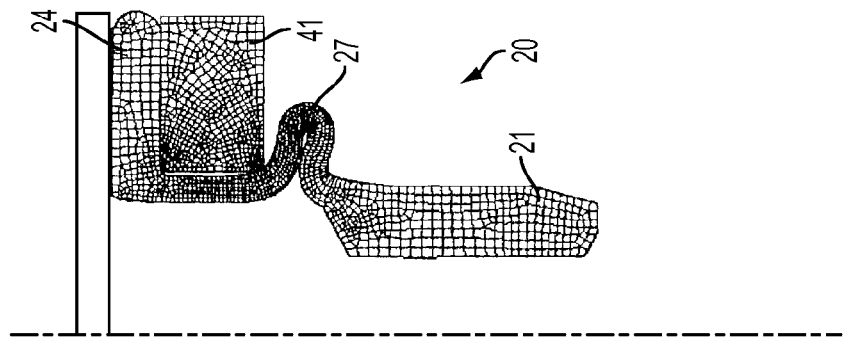
FIGS. 15A-15C illustrate a simulation in which a thin panel mounted member is mounted using a blind nut with a short tapered portion, where
Figure 15B:
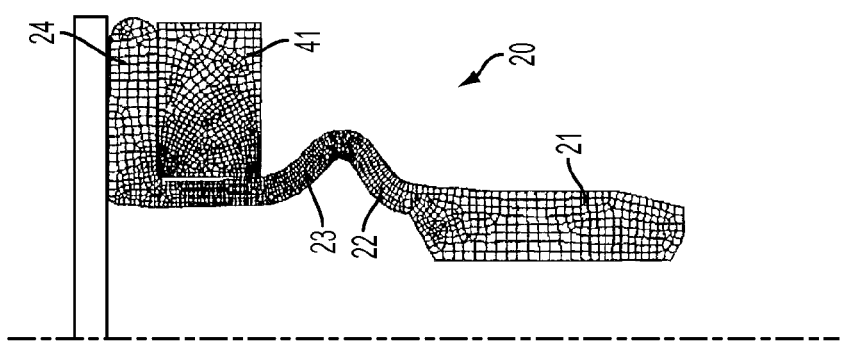
Figure 15A:
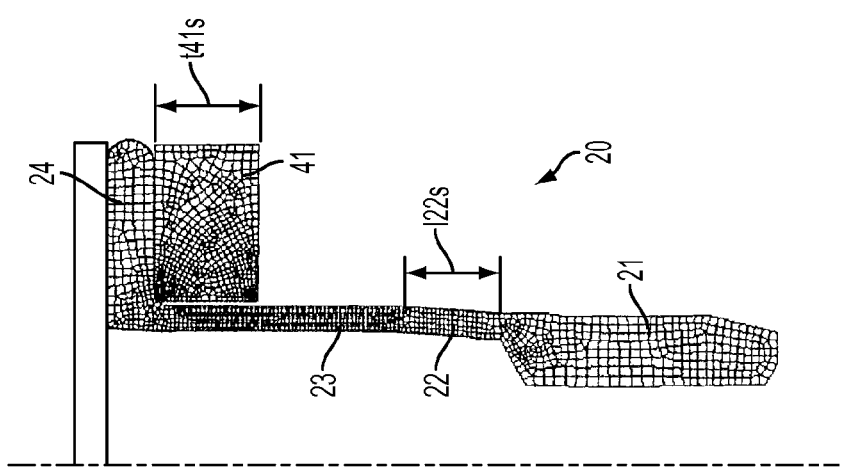

FIG. 15 through FIG. 20 show the results of simulations run under various conditions. FIG. 15 is a simulation in which a thin panel (t41s) mounted member 41 is mounted using a blind nut 20 with a short tapered portion 22 (l22s). FIG. 15(a) through FIG. 15(c) show the right half relative to the central axis y. FIG. 15(a) shows the stage in which the blind nut 20 is set in the mounted member 41. FIG. 15(b) shows the intermediate mounting stage. FIG. 15(c) shows the final mounting stage of the blind nut 20 in which the tapered portion 22 and the straight portion 23 have been curved, an enlarged-diameter portion 27 has been formed, and the mounted member 41 has been interposed between the enlarged-diameter portion 27 and the flange 24. In FIG. 15(c), the enlarged-diameter portion 27 occurs away from the bottom surface of the mounted member 41, and buckling has occurred.

Figure 16C:
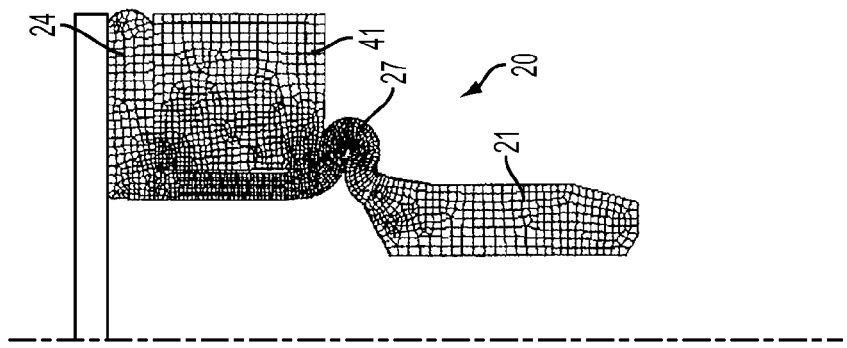
FIGS. 16A-16C illustrate a simulation in which a thick panel mounted member is mounted using a blind nut with a short tapered portion, where
Figure 16B:
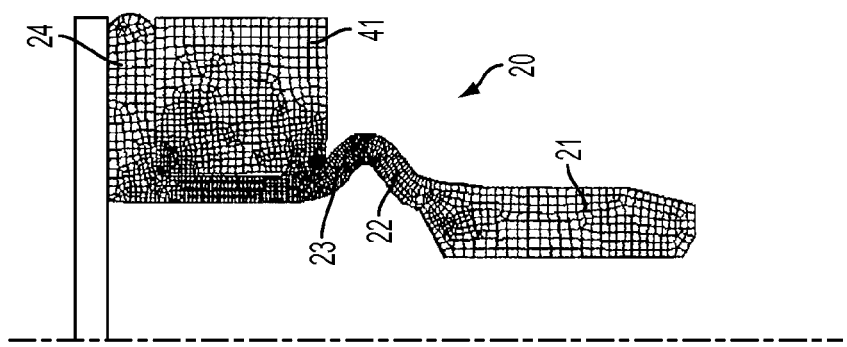
Figure 16A:
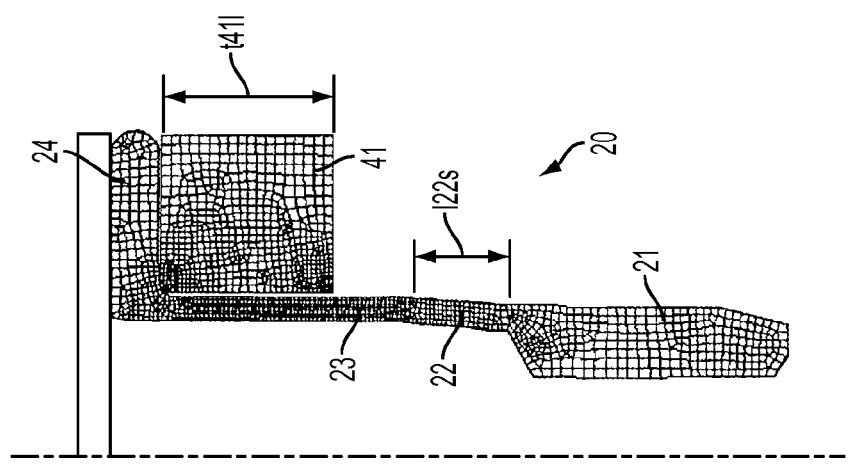

FIG. 16 is a simulation in which a thick panel (t41l) mounted member 41 is mounted using a blind nut 20 with a short tapered portion 22 (l22s).

Figure 17C:
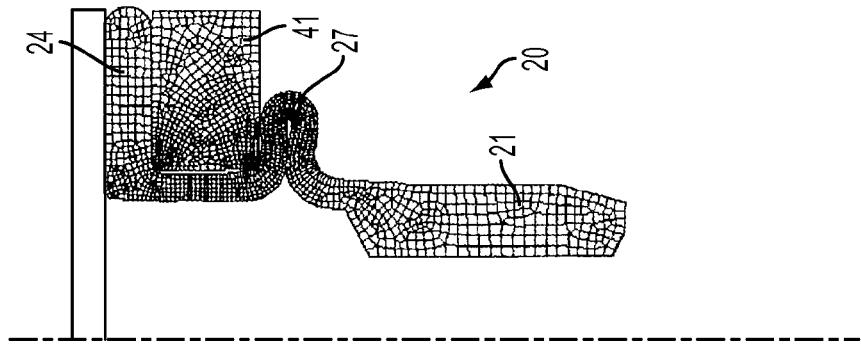
FIGS. 17A-17C illustrate a simulation in which a thin panel mounted member is mounted using a blind nut with a medium-length tapered portion, where
Figure 17B:
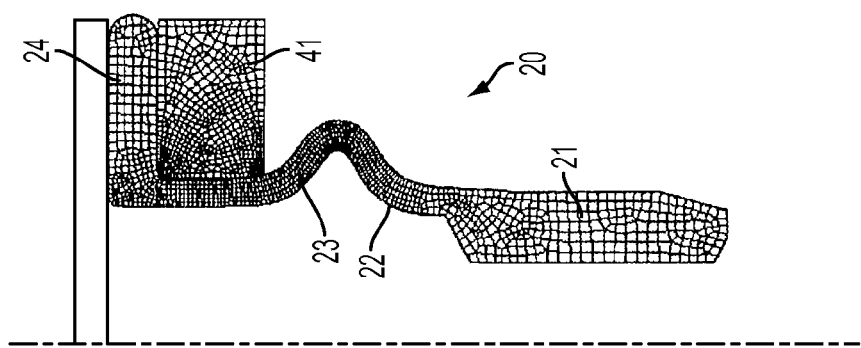
Figure 17A:
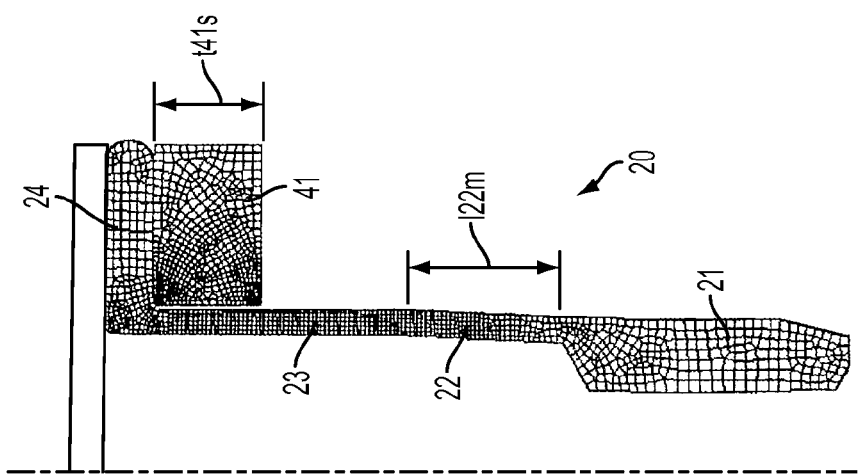

FIG. 17 is a simulation in which a thin panel (t41s) mounted member 41 is mounted using a blind nut 20 with a medium-length tapered portion 22 (l22m).

Figure 18A:
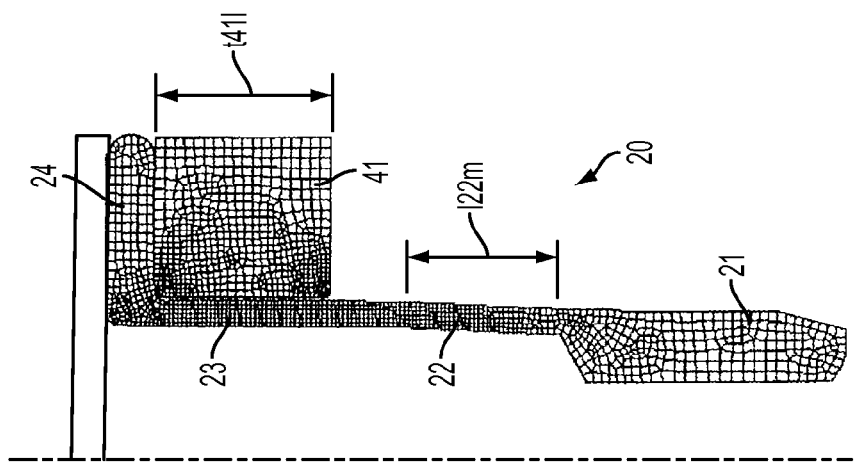
FIGS. 18A-18C illustrate a simulation in which a thick panel mounted member is mounted using a blind nut with a medium-length tapered portion, where
Figure 18B:
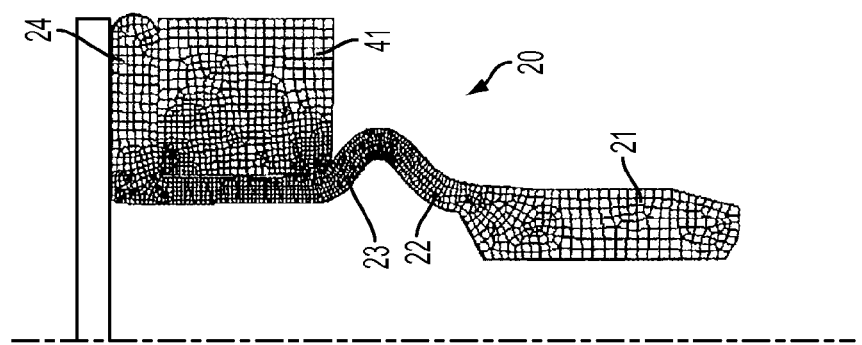
Figure 18C:
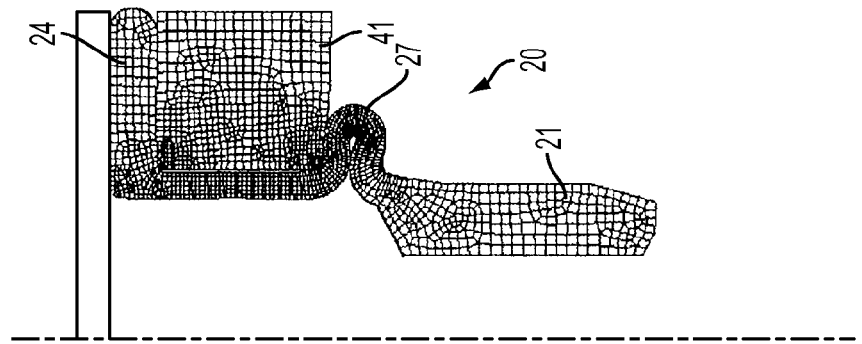

FIG. 18 is a simulation in which a thick panel (t41l) mounted member 41 is mounted using a blind nut 20 with a medium-length tapered portion 22 (l22m).

Figure 19C:
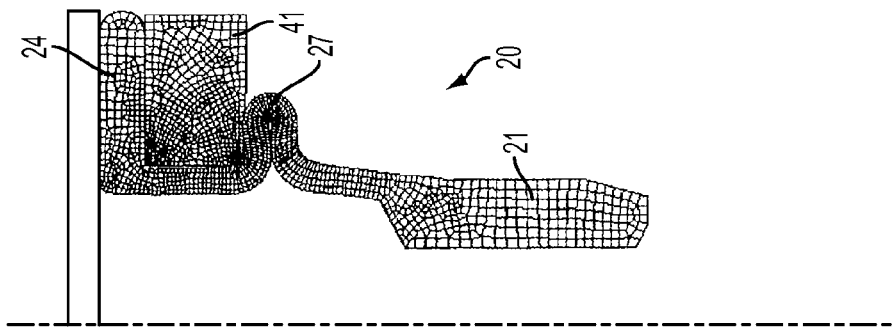
FIGS. 19A-19C illustrate a simulation in which a thin panel mounted member is mounted using a blind nut with a long tapered portion, where
Figure 19B:
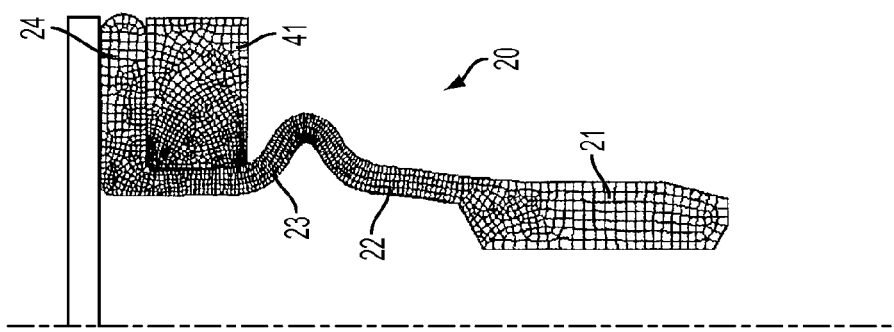
Figure 19A:
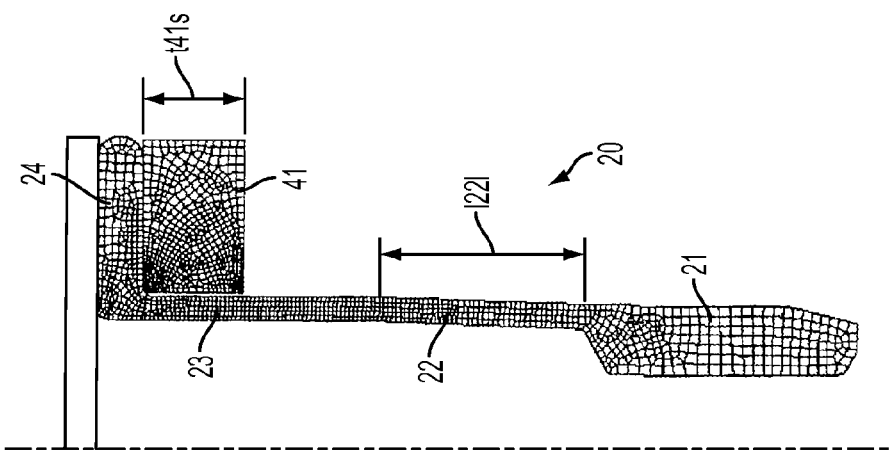

FIG. 19 is a simulation in which a thin panel (t41s) mounted member 41 is mounted using a blind nut 20 with a long tapered portion 22 (l22l).

In FIG. 16 through FIG. 19, the large-diameter portion 27 comes into contact with the surface of the mounted member 41, and the blind nut 20 is mounted properly.

Figure 20C:
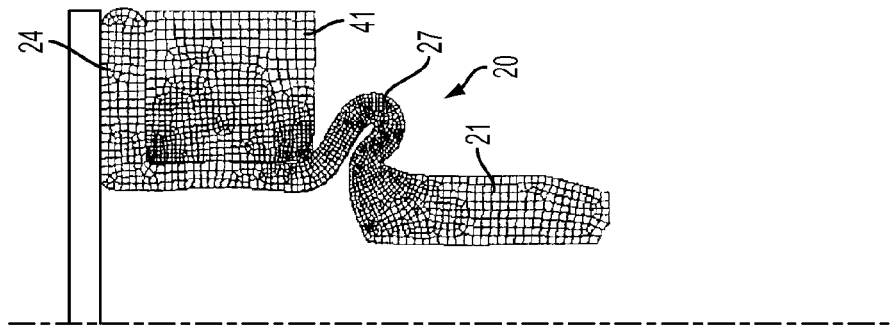
FIGS. 20A-20C illustrate a simulation in which a thick panel mounted member is mounted using a blind nut with a long tapered portion, where
Figure 20B:
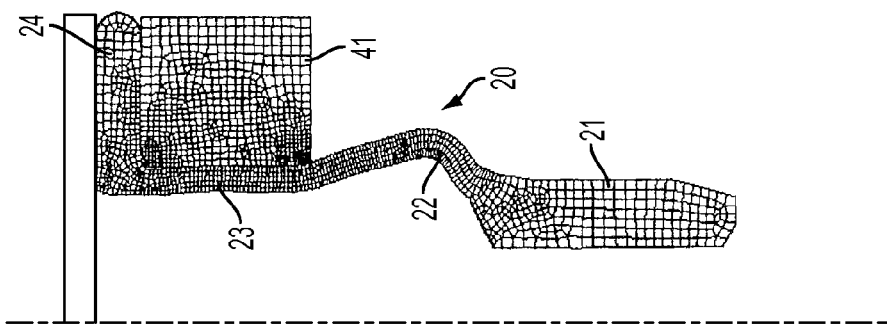
Figure 20A:
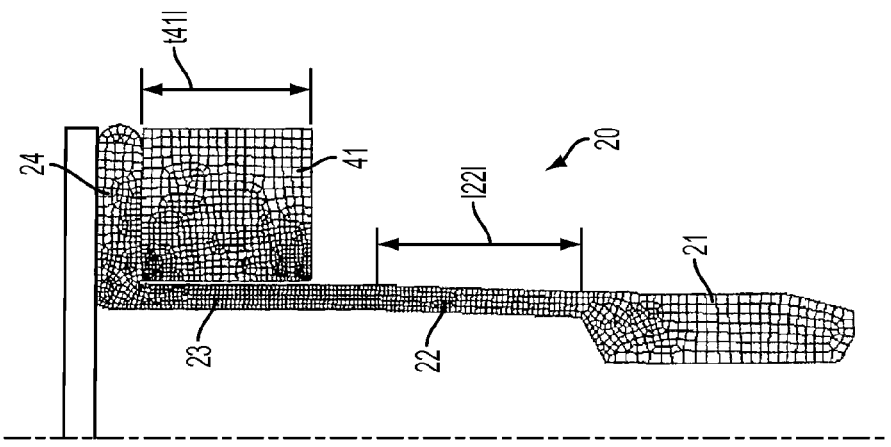

FIG. 20 is a simulation in which a thick panel (t41l) mounted member 41 is mounted using a blind nut 20 with a long tapered portion 22 (l22l). In FIG. 20(c), the enlarged-diameter portion 27 occurs away from the bottom surface of the mounted member 41, and buckling has occurred.

The simulation results are summarized in Table 1.

TABLE 1

Length l23 of Straight Portion 23 = 11 mm, Diameter D23 = 10 mm

| Length of Tapered Portion 22 | Thin Mounted Member 24 t24s = 3.3 mm | Thick Mounted Member 24 t24l = 5.5 mm |
| --- | --- | --- |
| Short l22s = 3.3 mm | FIG. 15 X (Buckling) | FIG. 16 ○ |
| Medium l22m = 5.0 mm | FIG. 17 ○ | FIG. 18 ○ |
| Long l22l = 6.7 mm | FIG. 19 ○ | FIG. 20 X (Buckling) |

The following is clear from the simulation results. A blind nut 20 with a straight portion 23 and a tapered portion 22 according to the present invention can be reliably fastened to a thick mounted member when the tapered portion 22 is short, but buckling is likely to occur when fastened to a thin mounted member. When the length of the tapered portion 22 is adjusted, it can be reliably fastened to a thick or thin mounted member. When the tapered portion 22 is long, the blind nut can be reliably fastened to a thin mounted member, but buckling is likely to occur when fastened to a thick mounted member.

In the embodiment of the present invention, the tube-shaped portion of the blind nut has a straight portion and a tapered portion. As a result, the blind nut can be easily mounted to mounted members such as panels having a wide range of thicknesses.

KEY TO TEXT IN FIGURES

10: Blind nut (prior art)
11: Internal threading portion
13: Tube-shaped portion
14: Flange
15: Internal threading
17: Enlarged-diameter portion
20: Blind nut
21: Internal threading portion
22: Tapered portion
23: Straight portion
24: Flange
25: Internal threading
26: Through-hole
27: Enlarged-diameter portion
41: Mounted member
42: Another mounted member
43: Mounting hole
44: Mounting hole
45: Bolt
46: Head portion
47: Shaft portion
50: Fastening tool
51: Main body portion
52: Nosepiece
53: Screw mandrel

The invention claimed is:

1. A blind nut including an internal threading portion having internal threading formed on the inside, a hollow tube-shaped portion adjacent to the threading portion, and an open flange formed in the tube-shaped portion on the end opposite the internal threading, the internal threading portion and the tube-shaped portion being inserted into a mounting hole in a mounted member, and a section of the tube-shaped portion being plastically deformed to enlarge the diameter, thereby gripping the mounted member between the deformed enlarged-diameter portion and the flange, and mounting the blind nut in the mounted member,
wherein the tube-shaped portion has a cylindrical straight portion adjacent to the flange, and a tapered portion of constant wall thickness, the tapered portion becoming gradually narrower from the straight portion towards the internal threading portion.

2. The blind nut according to claim 1, wherein the straight portion and the tapered portion have the same thickness.

3. The blind nut according to claim 1, wherein the angle of the tapered portion relative to the straight portion is from 1 to 20°.

4. The blind nut according to claim 3, wherein the angle is from 2 to 15°.

5. The blind nut according to claim 4, wherein the angle is from 3 to 8°.

6. The blind nut according to claim 1, wherein the blind nut is within the range of $0.09x_1+0.15<y_1<0.35x_1+1.5$, when the outer diameter of the straight portion is $x_1$ (mm) and the length of the section of the straight portion protruding from the mounted member is $y_1$ (mm).

7. The blind nut according to claim 1, wherein the blind nut is within the range of $0.22x_2+0.4<y_2<0.45x_2+1.4$, when the length of the straight portion is $x_2$ (mm) and the length of the tapered portion is $y_2$ (mm).

* * * * *